United States Patent [19]

Krumrey

[11] 4,195,832
[45] Apr. 1, 1980

[54] X-RAY PHOTOGRAPHIC APPARATUS

[75] Inventor: Günter Krumrey, Weisendorf, Fed. Rep. of Germany

[73] Assignee: Siemens Aktiengesellschaft, Berlin & Munich, Fed. Rep. of Germany

[21] Appl. No.: 941,309

[22] Filed: Sep. 11, 1978

[30] Foreign Application Priority Data

Sep. 13, 1977 [DE] Fed. Rep. of Germany ....... 2741223

[51] Int. Cl.² .............................................. B65H 5/06
[52] U.S. Cl. ................................... 271/274; 271/272
[58] Field of Search ................ 271/274, 272, 273, 80; 198/275, 624; 355/72; 354/315; 226/187, 108

[56] References Cited

U.S. PATENT DOCUMENTS

| 3,073,590 | 1/1963 | Romeo et al. | 271/80 |
| 3,340,618 | 5/1965 | Bentzman | 271/272 |

FOREIGN PATENT DOCUMENTS 2536563  2/1977  Fed. Rep. of Germany ........... 271/274
197709  12/1972  U.S.S.R. ................................. 198/624

*Primary Examiner*—Robert B. Reeves
*Assistant Examiner*—Brian Bond
*Attorney, Agent, or Firm*—Hill, Van Santen, Steadman, Chiara & Simpson

[57] ABSTRACT

In an exemplary photographic exposure installation, supply magazines for image sheets of varying format are provided with a transport path for transporting the image sheets between rollers bearing in a resilient fashion against both sides of the image sheets. The rollers disposed on different sides of the transport plane are axially offset relative to one another by at least one roller-width, the track gauges of the rollers are adapted in pairs to the distance between the lateral borders of each format to be transported, and the rollers associated with the smaller formats are smaller in their diameter as well as being arranged more closely to the center of the transport path than the rollers associated with the larger format.

13 Claims, 3 Drawing Figures

X-RAY PHOTOGRAPHIC APPARATUS

BACKGROUND OF THE INVENTION

The invention relates to an X-ray photographic apparatus comprising a photographic installation, comprising supply magazines for image layer carriers of varying format, comprising a transport path transporting the image layer carriers between rollers, bearing in a resilient fashion on both sides of said image layer carriers, from at least one receiving station associated with the supply magazines to the photographic exposure station, and to a release station.

In X-ray technology, it is general practice to transport the individual film sheets between transport rollers—disposed one on top of the other in a resilient manner—or between conveyer belts from one supply magazine to a photographic exposure station, and, following exposure, again from the photographic exposure station to a collector magazine. In so doing, one constantly endeavors to have the transport rollers run only along the border, and not, however, over the image (or picture) area, because, in the case of certain atmospheric humidities, electrostatic charge patterns are produced as a consequence of sliding and rolling friction which, upon development of the film material, are reproduced in the form of interfering line patterns, so-called lightening distortions.

From an X-ray photographic apparatus, disclosed in the German AS No. 11 93 799 (FIGS. 4, 5 and 6), wherein film sheets of varying size format are transported to a photographic exposure station, it is known to transport the film sheet along one single edge between transport rollers, bearing resiliently against one another, to the photographic exposure station and from the photographic exposure station to a collector magazine common to all formats. However, in the case of this solution, it is considered disadvantageous that it is possible to operate with only relatively low transport speeds and thus with low photographic exposure frequencies, because otherwise the film sheets would become canted on account of the eccentric action of the acceleration forces.

It has already been proposed to utilize transport paths wherein the track widths of the transport rollers associated with the two marginal regions of the film sheets are jointly adjusted during the selection of the film format. However, a considerable technical outlay would be connected with this procedure. Moreover, the photographic exposure repetition rate (or frequency) could not have been substantially increased on account of the time required for the track gauge adjustment.

SUMMARY OF THE INVENTION

Accordingly, the object underlying the invention consists in pointing out a way by means of which film sheets of varying size format can be transported at a high speed into X-ray photographic apparatus without lightening distortion (due to the electrostatic charge effects) becoming visible.

In the case of an X-ray photographic apparatus of the type initially cited, accordingly, in accordance with the invention, the rollers disposed on different sides of the transport plane are axially offset (or staggered) relative to one another by at least one roller-width, the track gauges of the rollers are adapted (or matched) in pairs to the spacing between edges (oriented parallel to the transport direction) of each format to be transported, and the rollers associated with the respectively smaller format are kept smaller in their diameter as well as being arranged more closely to the center of the transport path than the rollers associated with the larger formats. It is thereby possible to transport image layer carriers of varying size format with one single transport path. They are seized only at their opposite edges (or borders), not, however, in the image region. Thus, due to the two-sided support-mounting of the image layer carriers, the prerequisite is provided for the transmission of high accelerations and high photographic exposure frequencies, and protective transport is likewise insured due to the lack of contact with the image layer. Also, expensive apparatus for adaptation of the track to the selected formats thus become unnecessary.

In an advantageous embodiment of the invention, the mutually parallel shafts for the rollers, arranged on opposite sides of the transport plane, can be arranged in pairs, respectively, vertically one above the other. As a consequence of this, it is possible to press the rollers against the image layer carriers with relatively high pressure force and transmit high accelerations.

In an expedient further development of the invention, the rollers oppositely disposed to one another on both sides of the transport plane, associated with the respectively smallest format to be transported, can be adjusted, deviating from the rollers associated with the remaining formats, without any axial offset (or staggering) relative to one another for the purpose of maintaining a minimal center distance. By this means, the rollers associated with the smallest format roll on top of one another when no image layer carrier is inserted therebetween at a given time. They thus prevent an excessive mutual interengagement of the remaining rollers which are axially offset (or staggered) relative to one another. The latter instance would obstruct the introduction of the film sheets between the rollers. Thus, the rollers associated with the smallest format simultaneously ensure that the rollers, which are axially offset (or staggered) relative to one another, and arranged on the opposite shafts offer comparatively little resistance to the insertion of the film sheet.

A considerable simplification of the construction ensues if the rollers of each format associated with the two marginal regions on each side of the transport plane are arranged on a common shaft. The number of shafts and bearing can hereby be significantly reduced without any functional impairment of the transport path whatsoever.

The mutual spacing between the pairs of rollers perpendicular to the transport direction, and thus the outlay for the transport path can be further reduced if, in a particularly expedient further development of the invention, the transport plane is undulated in the transport direction. This has a consequence, the fact that the transverse stability of the individual image layer carriers is increased due to the slight curvature. The sagging (or dipping) of the larger formats in the direction of the central rollers associated with the smaller formats is thereby prevented.

Further details of the invention shall be explained in greater detail on the basis of the sample embodiments illustrated in the Figures; and other objects, features and advantages will be apparent from this detailed disclosure.

DETAILED DESCRIPTION

Figure 1:
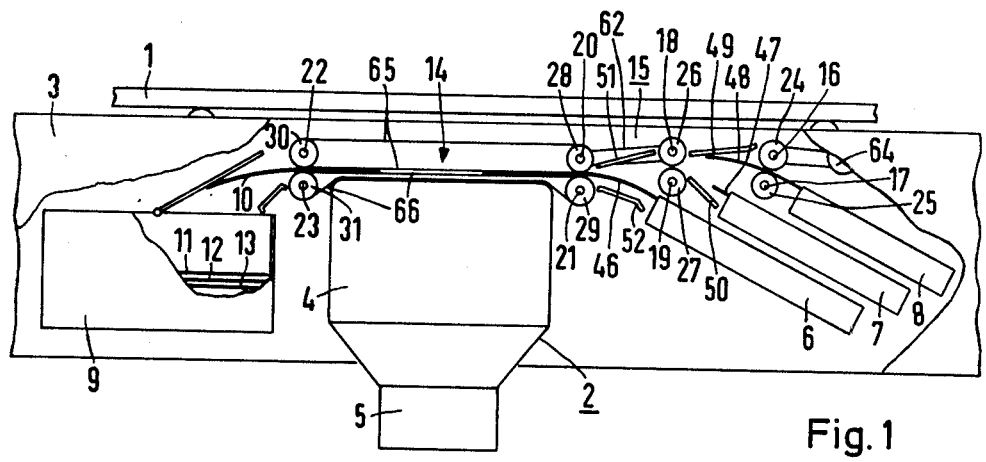
FIG. 1 shows a schematic illustration of an X-ray photographic installation partially opened-up.

In FIG. 1, an X-ray photographic installation 2 can be recognized arranged beneath a patient support 1. In the opened-up housing 3 of the X-ray photographic installation 2, there is disposed an X-ray image intensifier 4 with a mounted-on television camera 5. On the right side of the X-ray photographic installation, in FIG. 1, three supply magazines 6, 7, 8, for varying size film formats can be recognized, and on the left side of the X-ray photographic installation 2, a collector magazine 9 for the exposed film sheets 10, 11, 12, 13, can be recognized. There is disposed, directly in front of the side of the X-ray image intensifier 4 facing the patient support 1, the photographic exposure station 14 for the film sheets. The supply magazines 6, 7, 8, the photographic exposure station 14, and the collector magazine 9, are interconnected via a transport path 15. This transport path consists of a plurality of shafts 16, 17, 18, 19, 20, 21, 22, 23, arranged in pairs one above the other, with the rollers 24 through 45 for the transport of the film sheets 10, 11, 12, 13, 46, 47, 48. The gaps between the individual pairs of shafts are bridged by film-guide metal sheets 49, 50, 51, 52.

Figure 2:
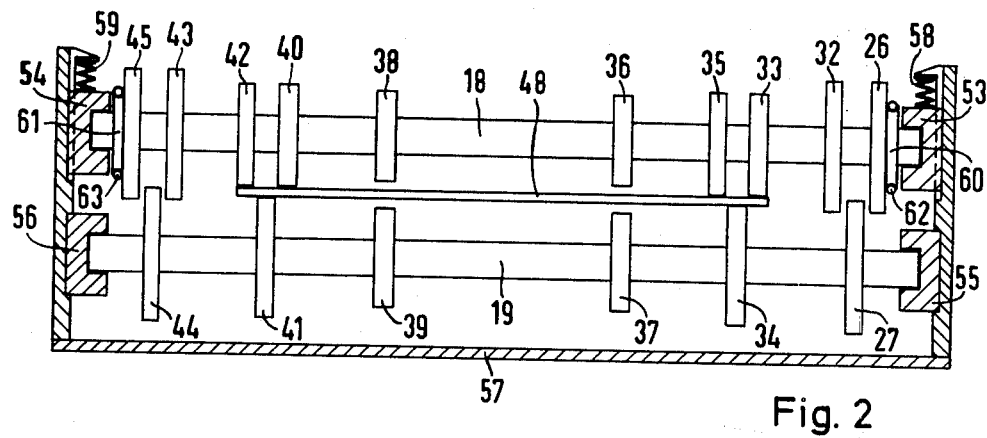
FIG. 2 shows the axial arrangement of the rollers.

FIG. 2 illustrates the arrangement of the individual rollers 26, 27, 32 through 45 on the shafts 18, 19, arranged on both sides of the transport plane. The arbors are mounted in bushings 53, 54, 55, 56, which are guided in frame 57 for the transport path 15. Whereas the two lower bushings 55, 56, in FIG. 2 are fixedly mounted in frame 57 of the transport path 15, the upper bushings 53, 54, in FIG. 2, are guided in frame 57 such as to be displaceable in height. The two upper bushings 53, 54, are pressed by means of one spring 58, 59, each in the direction of the lower bushings 55, 56. The lower shaft bears three roller pairs with respectively varying roller diameters. The mutual spacings between the rollers 27, 34, 37, 39, 41, 44 of each roller pair of the lower shaft 19 coincide precisely with the distances of the lateral borders or edges of the film sheets 46, 47, 48, to be transported. The rollers have approximately one-third of the width of these edges. There are associated, with each of the rollers of the lower shaft 19, two rollers 26, 32, 33, 35, 36, 38, 40, 42, 43, 45, on the upper shaft 18, which are arranged on the upper shaft in such a manner that the corresponding roller of the lower shaft 19 can interengage precisely between them. Only the smallest rollers 36, 37, 38, 39, of the two shafts 18, 19 are arranged such that they are precisely oppositely disposed one another and roll on top of one another if no film sheet is transported between them at a given time.

One pulley 60, 61, each (FIG. 2) is mounted on the sides (facing the bushing 53, 54) of the outermost rollers 26, 45 of the upper shafts 16, 18, 20. Over these pulleys, endless cables 62, 63 are tensioned, which couple each of the upper shafts 16, 18, 20 with the respectively next upper shaft and with a drive motor 64. In the region of the photographic exposure station 14; i.e., in radiation direction before the X-ray image intensifier (FIG. 1), no shafts are arranged. Instead, the rollers 28, 29, 30, 31, corresponding to one another, disposed immediately at the right and at the left of the photographic exposure station 14, are each wrapped by an endless belt 65, 66, which can be readily permeated by radiation. Since the frontal side of the X-ray image intensifier 4 is brought close to the transport plane, the lower sections of the belts, which are capable of irradiation, of the two lower shafts 21, 23, slide over the X-ray image intensifier 4.

Figure 3:
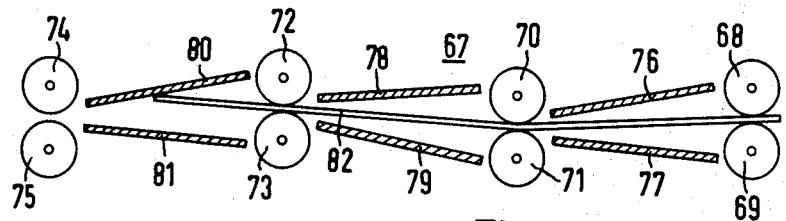
FIG. 3 shows the alignment of the shafts relative to the transport plane in the case of another longer transport path.

FIG. 3 illustrates, on the basis of a longer transport path 67, how the rollers 68, 69, 70, 71, 72, 73, 74, 75, arranged at both sides of the transport plane, are offset somewhat upwardly and downwardly alternately in pairs, such that the transport plane in transport direction forms a slightly serpentine (or wavy) line. The interstices between the roller pairs are filled out with funnel-shaped converging film-guide metal sheets 76, 77, 78, 79, 80, 81.

If, in order to retain a medical diagnostic finding ascertained by means of the X-ray image intensifier-television chain, the supply magazine 6, 7, 8, is selected with the film format suitable for this purpose, then the removal apparatus—not further illustrated here—of the selected supply magazine ejects a film sheet. With the selection of the film format, the drive motor 64 for the rollers 24 through 45 is also simultaneously switched on. If an intermediate film format were to be selected, the central supply magazine 7 would press this film sheet between the rollers 26, 27, mounted on the shafts 18, 19. Due to the film sheet, the upper shaft 18 with the rollers 26, 32, 33, 35, 36, 38, 40, 42, 43, 45 (FIG. 2) would be raised somewhat counter to the force of the two springs 58, 59. Since the supply magazines 6, 7, 8 are centered relative to the center of the transport path 15, the film sheet is seized at its two marginal regions by the rollers 33, 34, 35, 40, 41, 42, and transported into the photographic exposure station 14. Since the rollers 36, 37, 38, 39, for the next-smaller film format, arranged further toward the center of the shafts 18, 19, are also kept smaller in their diameter, they cannot touch the emulsion layer of the larger film format. The sagging of the larger film formats onto these smaller rollers 36 through 39, mounted near the center of the shafts 18, 19, is prevented by virtue of the fact that the transport plane is slightly undulated in the transport direction due to the alternate higher and lower bearing of the lower shafts 17, 19, 21, as is illustrated on the basis of FIG. 3 and rollers 69, 71, 73, 75. Due to this slight waviness, the film sheets are also bent somewhat. Their stiffness transversely to the direction of curvature thus increases considerably. In any case, this effect is totally sufficient in order to prevent a sagging of the central regions of the film sheets onto the smaller rollers.

Through the funnel-shaped film-guide metal sheets 49, 50, 51, 52, the film sheets are repeatedly threaded between the next-following roller pairs. As a consequence of the mutual inclination of the film-guide metal sheets, when a minimum aperture angle of approximately 20° has been attained, it is then possible for the film sheets 82 to touch these guide metal sheets 76 through 81 only with their front, non-sensitive edges and not, however, with their image layers. Upon reaching the photographic exposure station 14, the drive motor 64 for the rollers is switched "off" via an infrared-light barrier—not illustrated here—which scans the edge of the film sheets. After exposure has taken place, the drive motor for the rollers is again switched "on" for a short period of time via a time switch, likewise not further illustrated. In so doing, the respectively exposed film sheet is further transported to the collector magazine 9.

It would also be possible to center the supply magazines not relative to the center of the transport path, but relative to a lateral edge of the transport path. The advantage connected herewith would consist in that, on this side of the transport path, a single vertically aligned roller pair would be required with rollers at the opposite sides of the transport plane, which roller pair would be associated with the marginal region of all formats. Further, rollers (of graduated diameter and axially offset) such as are indicated in FIG. 2, would then be necessary only for the other lateral side of the transport path. However, the drawback which would stand in the way of this advantage would be that the photographic exposure region would no longer be disposed centrically relative to the fluoroscopy field; i.e., centrically relative to the inlet fluorescent screen of the X-ray image intensifier.

It will be apparent that many modifications and variations may be effected without departing from the scope of the novel concepts and teachings of the present invention.

I claim as my invention:

1. An X-ray photographic apparatus comprising a photographic exposure installation, comprising supply magazines for image layer carriers of varying size format, and comprising a transport path for transporting the image layer carriers between rollers, bearing in a resilient fashion against both sides of the image layer carrier, from at least one receiving location associated with the supply magazines to the photographic exposure installation, and to a release station, characterized in that the rollers (24 through 45, 68 through 76), disposed on different sides of the transport plane, are axially offset relative to one another by at least one roller-width, that the track gauges of the rollers are adapted in pairs to the distance between the edges, aligned parallel to the transport direction, of each format to be transported, and that the rollers associated with a smaller format are smaller in their diameter as well as also being arranged more closely to the center of the transport path (15) than the rollers associated with a larger format.

2. An X-ray photographic apparatus according to claim 1, characterized in that mutually parallel shafts (16 through 23), arranged on opposite sides of the transport plane, for the rollers (24 through 45) are superimposed in pairs, respectively, perpendicularly to the transport path.

3. An X-ray photographic apparatus according to claim 2, characterized in that the rollers (36, 37, 38, 39), associated with the smallest format to be transported, are oppositely disposed to one another on both sides of the transport plane, and are mounted without any axial offset relative to one another for the purpose of maintaining a minimum center distance.

4. An X-ray photographic apparatus according to claim 1, characterized in that the rollers (24 through 45, 68 through 75) for each format, associated with the two marginal regions on each side of the transport plane, are arranged on a common shaft (16 through 23).

5. An X-ray photographic apparatus according to claim 1, characterized in that the transport plane is undulated in the transport direction.

6. An X-ray photographic apparatus according to claim 1, characterized in that the gaps between the individual shafts (16 through 21) on each side of the transport plane are bridged with guide sheets (49 through 52).

7. An X-ray photographic apparatus according to claim 6, characterized in that the guide sheets (49, 50, 51, 52, 76 through 81) converge in a funnel-shaped fashion in the transport direction.

8. An X-ray photographic apparatus according to claim 1, characterized in that, in the case of a flush transport of all formats along one side of the transport path, there are arranged, along the latter side of the transport path, roller-pairs superimposed in a resilient fashion, which roller pairs are common to the marginal regions of all the formats.

9. An X-ray photographic apparatus according to claim 1, characterized in that the rollers (26, 27, 32 through 45), arranged on both sides of the transport plane, are pressed against one another by the force of springs (58, 59).

10. An X-ray photographic apparatus according to claim 1, characterized in that the rollers (68 through 75), arranged on both sides of the transport plane, are pressed against one another by gravitational force.

11. An X-ray photographic apparatus according to claim 1, characterized in that the rollers on one side of the transport plane are manufactured from metal, and that the rollers of the opposite side are manufactured from synthetic material (or plastic).

12. An X-ray photographic apparatus according to claim 1, characterized by conveyer belts (65, 66), guided over the individual rollers (28, 29, 30, 31).

13. An X-ray photographic apparatus according to claim 1, characterized by a motor drive (64) for the shafts (16, 18, 20).

* * * * *